(12) United States Patent
Yoon

(10) Patent No.: US 8,585,010 B2
(45) Date of Patent: Nov. 19, 2013

(54) VALVE OPERATED BY A MASTER KEY

(75) Inventor: Jong Chan Yoon, Busan (KR)

(73) Assignee: BMT Co., Ltd., Yangsan-si (KR)

(*) Notice: Subject to any disclaimer, the term of this patent is extended or adjusted under 35 U.S.C. 154(b) by 669 days.

(21) Appl. No.: 12/663,674

(22) PCT Filed: Jul. 9, 2007

(86) PCT No.: PCT/KR2007/003322
§ 371 (c)(1),
(2), (4) Date: Feb. 2, 2010

(87) PCT Pub. No.: WO2008/150043
PCT Pub. Date: Dec. 11, 2008

(65) Prior Publication Data
US 2010/0218830 A1 Sep. 2, 2010

(30) Foreign Application Priority Data
Jun. 8, 2007 (KR) .................. 10-2007-0055763

(51) Int. Cl.
*F16K 35/06* (2006.01)
*F16K 35/02* (2006.01)

(52) U.S. Cl.
USPC ........ 251/104; 251/101; 137/384.2; 137/385; 70/176

(58) Field of Classification Search
USPC ................ 137/383, 384.2, 384.6, 384.8, 385; 251/90, 92, 93, 95, 101, 104, 106, 110; 70/174, 175, 176, 177, 178, 179, 180, 70/227, 230
See application file for complete search history.

(56) References Cited

U.S. PATENT DOCUMENTS

| | | | | |
|---|---|---|---|---|
| 506,087 A * | 10/1893 | Adkins et al. | ................... | 70/176 |
| 557,943 A * | 4/1896 | Bayley et al. | ................ | 251/110 |
| 594,229 A * | 11/1897 | Cline et al. | ...................... | 70/176 |
| 846,257 A | 3/1907 | Stratiff | | |
| 924,423 A * | 6/1909 | Bradenburg | ..................... | 70/176 |
| 1,059,138 A * | 4/1913 | Gaither | .......................... | 70/179 |
| 1,079,847 A * | 11/1913 | Dunkel et al. | ................ | 251/288 |
| 1,412,720 A * | 4/1922 | Szafranski | ...................... | 70/176 |
| 2,234,052 A * | 3/1941 | Luenz | ........................ | 137/556.3 |
| 3,699,998 A * | 10/1972 | Baranowski, Jr. | ............ | 137/327 |
| 4,483,366 A | 11/1984 | Labita | | |
| 5,284,178 A * | 2/1994 | Lardieri | ................... | 137/315.23 |
| 8,418,515 B2 * | 4/2013 | Yoon | ............................... | 70/176 |

FOREIGN PATENT DOCUMENTS

| | | |
|---|---|---|
| JP | 10-196807 A | 7/1998 |
| JP | 2004-11880 A | 1/2004 |
| KR | 20-0388434 Y1 | 6/2005 |

* cited by examiner

*Primary Examiner* — John K Fristoe, Jr.
*Assistant Examiner* — Jonathan Waddy
(74) *Attorney, Agent, or Firm* — Birch, Stewart, Kolasch & Birch, LLP

(57) ABSTRACT

The present invention relates to a valve used to control fluid flow. The valve includes a handle, which is placed above a body and is connected directly or indirectly to a top portion of a stem; a cap, into which the stem is inserted, and which surrounds a top portion of the body, the cap having a plurality of locking holes formed in the circumference of a top portion thereof in a circular arrangement. The handle has a vertical hole corresponding to the locking holes and a key hole extending coaxially with or perpendicularly to the vertical hole, and is connected to the top portion of the stem to contact the top portion of the cap. Locking means is provided in the vertical hole and the locking holes to lock the handle and the cap to each other. The locked position is released using a master key, which is inserted through the key hole, thereby allowing the handle to be operated.

11 Claims, 5 Drawing Sheets

VALVE OPERATED BY A MASTER KEY

TECHNICAL FIELD

The present invention relates to a valve used to control fluid flow, particularly, one which is operated using a master key so that only an authorized person can open or close the valve in order to ensure safety and prevent accidents. More particularly, the present invention relates to a valve operated using a master key, in which a stem for controlling fluid flow is configured to move up or down in response to the rotation of a handle.

BACKGROUND ART

Pipes for delivering liquid or gaseous material are widely used in industry, and valves are essentially mounted on the pipes to control fluid flow. Such valves include various types, all of which function to control fluid flow or regulate the flow rate.

Since various types of valves exist, a suitable one is selected according to the use thereof. Important valves include ball valves, butterfly valves, gate valves, safety valves, diaphragm valves, needle valves, glove valves, angle valves and so on.

Among the various kinds of valves, the present invention relates to a valve, which includes a stem and a handle connected to the stem, and in which the handle and the stem operate in response to the rotation of the handle to adjust the flow rate or control fluid flow.

A conventional needle valve will be described briefly with reference to FIG. 1, which is a partial sectional view illustrating the structure of the needle valve.

The needle valve includes a stem 1, a body 2 and a handle 3. The stem 1 is connected at the bottom portion thereof to a disk to open or close a flow passage, the body 2 forms the basic exterior of the valve, the stem 1 protrudes from the top portion of the body 2, and the handle 3 is connected to the stem. A nut 4 is fastened to the top portion of the body 2 to press the same, thereby preventing leaks. Since the nut is constantly fixed, when the handle is rotated, the handle and the stem move up and down together.

However, since the needle valve does not have a safety device that can restrict the operation of the handle, anyone can operate the handle to control fluid flow. In particular, if this kind of valve is used in dangerous equipment, even a small mistake in the operation of the valve can cause massive damage to property and endanger human lives.

Accordingly, when valves are used in important industrial facilities, safety devices and careful management are additionally required, thereby increasing costs.

DISCLOSURE

Technical Problem

The present invention has been made to solve the foregoing problems with the prior art, and therefore the object of the present invention is to provide a safety device to a valve, such as a needle valve, a diaphragm valve and a gas valve used in a Liquefied Petroleum Gas (LPG) tank, in which a stem moves vertically, so that only an authorized person can open or close the valve.

Another object of the present invention is to provide a valve structure, by which a safety device can be applied to an existing valve without greatly changing the shape of the valve.

Technical Solution

As an aspect for realizing the above object of the present invention, there is provided a valve including a handle placed above a body and connected directly or indirectly to the top portion of a stem protruding from the body, the handle being movable vertically when rotated, thereby opening or closing a flow passage inside the body; a cap, into which the stem is inserted, and which surrounds the side of a top portion of the body and is allowed to move only vertically, the cap having a plurality of locking holes formed in the top portion thereof in a circular arrangement; the handle, having a vertical hole corresponding to the locking holes and a key hole extending coaxially with or perpendicularly to the vertical hole, the handle connected to the top portion of the stem to contact the top portion of the cap; and locking means provided in the vertical hole and the locking holes to lock the handle and the cap to each other, thereby limiting rotation of the handle, wherein a locked position is released using a master key, which is inserted through the key hole, thereby allowing operation of the handle.

Preferably, the locking means include an elastic member placed inside the vertical hole; and a rod pin having a top portion supported by the elastic member and a bottom portion inserted into one of the locking holes, wherein the rod pin has a guide section in an outer portion adjacent to the top portion, the guide section partially overlapping the key hole, which crosses the vertical hole, wherein the master key is inserted through the key hole and contacts the guide section so that the rod pin moves up to release the locked position. More preferably, the guide section has the shape of a neck having a reduced diameter portion.

According to another aspect of the present invention, the locking means includes elastic members, each of which is placed inside a respective one of the locking holes of the cap; stoppers, each of which has a bottom portion in contact with a respective one of the elastic members and a top portion protruding above the top portion of the cap; a rod pin placed inside the vertical hole, the rod pin having a bottom portion in contact with one of the stoppers and a top portion protruding into the key hole formed in a direction across the vertical hole, wherein the master key is inserted through the key hole to push down the rod pin in order to move the stopper, which is partially inserted into the vertical hole, into the locking hole, thereby releasing the locked position.

According to another aspect of the present invention, the locking means includes elastic members, each of which is placed inside a respective one of the locking holes of the cap; stoppers, each of which has a bottom portion in contact with a respective one of the elastic members and a top portion protruding above the top portion of the cap; a rod pin, placed inside the vertical hole, the rod pin having the bottom portion in contact with one of the stoppers and the top portion extending along a line coaxial with the vertical hole and leading to the key hole, which extends through the top portion of the handle, wherein the master key is inserted through the key hole to push down the rod pin in order to move the stopper, which is partially inserted into the vertical hole, into the locking hole, thereby releasing the locked position.

Preferably, each of the stoppers has a wedge groove formed in an outer circumference thereof, adjacent to the top portion thereof, so that external force can be applied in an emergency to cause a fracture along the wedge groove, thereby releasing the locked position.

Preferably, the handle further has a female threaded portion extending across the key hole, so that a bolt engaging with the female threaded portion fixes the master key inserted into the key hole.

Preferably, the body has rotation-preventing means placed in the top portion of the body, which engages with the cap, wherein the rotation-preventing means prevents the cap from rotating. More preferably, the rotation-preventing means is a polygonal nut or a guide slot.

Preferably, the cap is moved up or down along with the handle by restraining means, which is placed in the stem or the handle, when the handle is moved up or down. More preferably, the restraining means comprises a snap ring coupled to the stem or the handle or a support section formed by giving portions of the stem different diameters.

Preferably, the locking holes of the cap have a shape selected from a group consisting of a circle, a polygon and a slot. More preferably, the locking holes have a slope allowing the handle to freely rotate in an opening or closing direction, whereby the lower portion of a rod pin rises in contact with and along the slope.

Preferably, a through hole is formed in the top portion of the stem, a pin is inserted into the through hole, and a bolt is screwed through a side portion of the handle to butt against the pin, so that the handle has a predetermined amount of play.

Preferably, a bolt extending from the top portion of the handle is provided to connect the handle to the stem, a lug protrudes from the stem, and a lug recess is formed in the handle, the lug recess corresponding to but wider than the lug, so that the handle is allowed to play.

Preferably, a cover plate is provided between the handle and the stem and is held to the stem by a bolt, wherein the cover plate and the handle are connected with each other by male and female teeth so that rotational force is transmitted, and wherein pluralities of indentations are formed in the inner circumference of the cover plate, into which the stem is inserted, to give play to the handle, so that play exists in an amount in the range of one pitch of neighboring indentations.

Preferably, the valve is a needle valve, a gas valve, or a diaphragm valve, in which a flow passage is opened or closed by the vertical movement of the handle and the stem.

Preferably, a spring is also provided between the body and the cap. Preferably, the key hole has a shape selected from a group consisting of a circle, a polygon and an irregular shape, or a combination thereof.

Advantageous Effects

As set forth above, the valve of the present invention can only be operated using the master key, and thus is suitable for use in places where safety is critical.

The valve of the present invention can prevent safety hazards such as explosions, either intentionally or due to negligence, thereby reducing damage to property and the risk to human lives.

Figure 1:
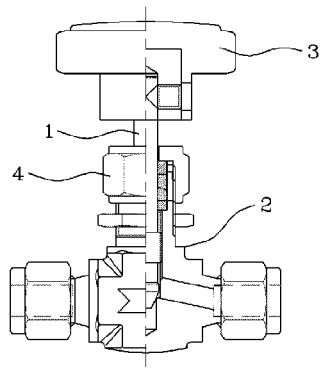
FIG. 1 is a partial sectional view illustrating the structure of a conventional needle valve.

| <Major Reference Numerals of the Drawings> | |
|---|---|
| 100: handle | 110: vertical hole |
| 120: key hole | 130: locking means |
| 130a: elastic member | 130b: rod pin |
| 130c: stopper | 131: guide section |
| 200: body | 210: rotation-preventing means |
| 300: stem | 310: through hole |
| 320: lug | 400: cap |
| 410: locking hole | 415: slope |
| 420: restraining means | 420a: support section |
| 420b: snap ring | 500: cover plate |
| 510: indentation | M: master key |

BEST MODE

A valve operated by a master key (hereinafter referred to as "valve") according to the present invention will now be described more fully with reference to the accompanying drawings, in which exemplary embodiments thereof are shown. It should be understood that the following drawings are merely given for illustrative purposes in consideration of the fact that the substance of the present invention resides in the technical principle rather than in a simple structure or shape. It should also be understood that all alterations or modifications that can be derived from the definitions and scope of the claims and their equivalents fall within the scope of the invention.

Prior to the description of the detailed embodiments, the basic components common to all of the embodiments will be described first. The valve of the present invention can be applied to any type of valve, in which a handle 100 for opening or closing a flow passage is provided above a body 200 and is connected to the top portion of a stem 300, so that the handle vertically moves together with the stem when rotated.

On the top portion of the body 200, a cap 400 is disposed with a lower portion opened to surround the exterior of the top portion of the body 200. The stem 300 protrudes from the body 200 and is inserted into and assembled to the cap 400. On the top face of the cap 400, pluralities of locking holes 410 are formed in a circular arrangement. The cap 400 is placed on the top portion of the body 200 and is movable vertically. When the handle 100 and the stem 300 rotate, the cap 400 vertically moves without rotating.

The handle 100 is connected to the top portion of the stem 300 and is in contact with the top portion of the cap 400. The handle 100 has a vertical hole 110 and a key hole 120, which cross each other or are coaxially arranged. In particular, the vertical hole 110 is formed in a position corresponding to the locking holes 410 in the top portion of the cap 400. Only one vertical hole 110 is formed, and it extends vertically from the bottom portion of the handle 100. In response to the rotation of the handle, the vertical hole 110 becomes aligned with any of the locking holes. The key hole 120 is formed horizontally from the side portion of the handle 100 to cross the vertical hole 110. Alternatively, the key hole 120 can be formed vertically from the top portion of the handle 100 to be arranged coaxially with and connected to the vertical hole 110.

As a characteristic feature of the present invention, a master key M is used to operate the locked handle 100, and locking means 130 is provided to lock the handle 100 and the cap 400 to each other in order to restrict the rotation of the handle 100. The locking means 130 is provided in the vertical hole 110 of the handle 100 and the locking holes 410 of the cap 400. When the locking means 130 is locked, the handle cannot rotate. To unlock the locking means 130, the master key M is inserted into the key hole 120 to release the handle and the cap from the locked position.

The locking means 130 can be suitably selected according to necessity, and can be modified to have various forms in a detailed configuration. However, it should be understood that such modifications do not depart from the scope of the present invention as long as they carry out the same function.

The first locking means that can be adopted as the locking means 130 may include an elastic member 130*a* and a rod pin 130*b*. The elastic member 130*a* is placed inside the vertical hole 110 and the rod pin 130*b* is also placed inside the vertical hole 110. The top portion of the rod pin 130*b* is supported by the elastic member 130*a*, and the bottom portion of the rod pin 130*b* is configured to be inserted into any one of the locking holes 410. In particular, a guide section 131, provided adjacent to the top portion of the rod pin 130*b*, acts to raise the rod pin, which maintains the handle and the cap in the locked position, so that the rod pin can release the locked position. The guide section helps the master key, inserted through the key hole, raise the rod pin. The guide section 131 of the rod pin 130*b* is formed in the vertical hole 110 and partially overlaps the key hole 120, which crosses the vertical hole 110. That is, when the rod pin 130*b* is at the bottom dead center, the top portion of the guide section 131 is exposed to the key hole 120. When the master key M is inserted through the key hole 120, the end of the master key contacts the guide section 131. As the master is inserted further, the rod pin 130*b* comes to rise further.

The configuration of the guide section and the shape of the master key can be variously modified, and the shape of the master key can be changed to conform to the shape of the configuration of the guide section.

The second locking means 130 that can be adopted in the present invention includes elastic members 130*a*, stoppers 130*c* and a rod pin 130*b*. The elastic members 130*a* are placed inside the locking holes 410, and the stoppers 130*c* are placed on top of the elastic members. The bottom portion of each stopper 130*c* contacts a respective elastic member 130*a*, and the vertical position of the stopper 130*c* can be varied due to the elasticity of the elastic member. The top portion of the stopper 130*c* protrudes over the top portion of the cap 400 to enter the vertical hole 110. The rod pin 130*b* is placed inside the vertical hole 110, the bottom portion of the rod pin 130*b* maintains contact with the top portion of the stopper 130*c*, and the top portion of the rod pin 130*b* projects into the key hole 120, which is formed across the vertical hole 110. When one of the stoppers 130*c* becomes coaxial with the rod pin 130*b*, the stopper 130*c* pushes up the rod pin 130*b*, and the top portion of the stopper 130*c* is inserted into the vertical hole 110. When the stopper 130*c* has been inserted into both the locking hole 410 and the vertical hole 110, locking is achieved and the handle 100 cannot rotate. In order to release the locked position, the master key M is inserted through the key hole 120 and moves the rod pin 130*b* downward. The rod pin 130*b*, moved downward by the master key M, pushes the stopper 130*c* so that the stopper moves into the locking hole 410.

The third locking means include elastic members, stoppers and a rod pin, like the second locking means, but the vertical and key holes are arranged coaxially and the master key is inserted vertically.

In the case where the stopper 130*c* is provided in the locking means 130, a wedge groove 132 is preferably formed along the outer periphery in the top portion of the stopper. In the locked position, the wedge groove 132 is located in the interface area between the handle and the cap. The wedge groove 132 is the weakest portion of the stopper 130*c*, and if the master key is missing or an emergency occurs, it is possible to apply a large force to the handle to cause a fracture in or around the wedge groove. When the wedge groove 132 is fractured, the stopper cannot restrain the handle and the cap any longer, and the handle can be operated.

A female threaded portion 140, which can fix the location of the master key inserted through the key hole 120, is preferably formed in the handle 100. The female threaded portion 140 is engaged with a bolt, and extends perpendicular to the direction of the key hole, so that the master key can be fixed at a predetermined position using the bolt.

The present invention can be applied to any valve irrespective of the kind thereof, as long as a handle and a stem simultaneously move up and down as a basic operation mode. Since the operation of the handle is securely restricted, the valve of the present invention can ensure safety.

Figure 2:
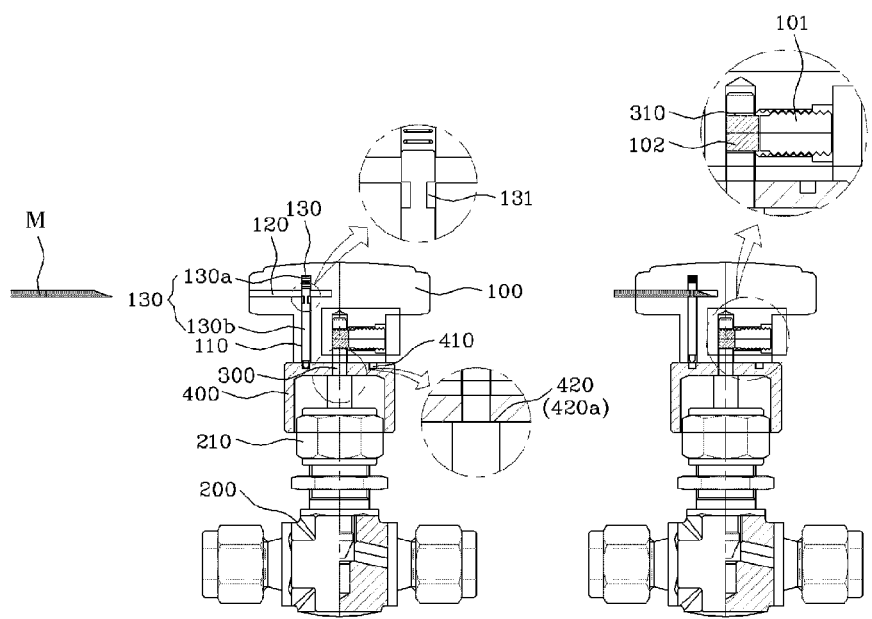
FIG. 2 is configuration views illustrating the structure of a needle valve according to a first embodiment of the present invention.

A first preferred embodiment of the present invention, which is applied to a needle valve, as shown in FIG. 2, will be described in detail. FIG. 2 is configuration views illustrating the structure of the needle valve according to the first embodiment of the present invention, and FIG. 3 is a plan view of the cap.

Figure 3:
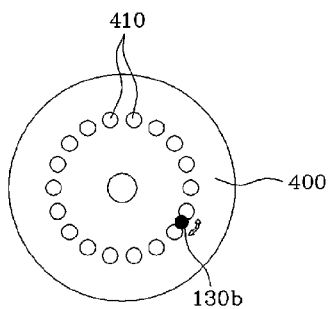
FIG. 3 is a plan view of the cap.

As shown in FIGS. 2 and 3, the needle valve basically includes a body 200, a handle 100 and a stem 300, and additionally a cap 400, locking means 130 and vertical and key holes 110 and 120, which are formed in the handle.

The cap 400 is formed on the top portion of the body 200, and is set so as to move only vertically. The top portion of the body 200, which is surrounded by the interior of the cap 400, provides rotation-preventing means 210. Thanks to the rotation-preventing means 210, the cap 400 can move vertically without rotating. While the rotation-preventing means 210 may include a polygonal nut, a guide slot or the like, this embodiment adopts a polygonal nut as the rotation-preventing means. The polygonal nut corresponds to a part that is engaged with the top portion of the body in a typical needle valve. The polygonal nut can be configured in various forms, for example, hexagonal and octagonal. Since the interior of the cap is machined into the form of a polygon, conforming to the polygonal nut, the cap can be fitted onto the polygonal nut.

Figure 4:
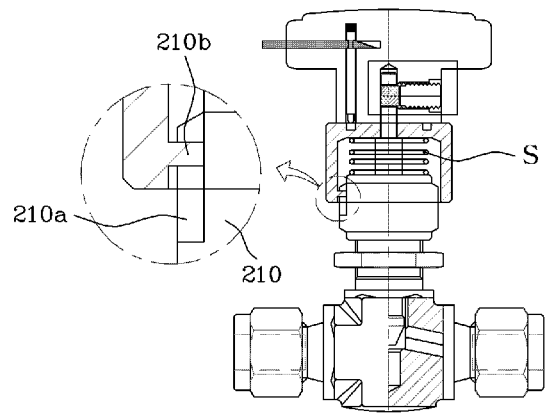
FIG. 4 is a configuration view illustrating a needle valve to which a guide slot is adopted as rotation-preventing means.

While the rotation-preventing means 210 can be most economically implemented with the polygonal nut, this is not intended to limit the present invention. The rotation-preventing means 210 can also be implemented with a guide slot, as shaped in FIG. 4. As shown in the drawing, in the side of the top portion of the body 200, on which the cap 400 is surrounded, a guide slot 210*a* extends vertically in the form of an elongated tack-shaped groove. In the interior of the cap 400, a guide protrusion 210b extends into the guide slot 210a. Because of this configuration, the cap can move only in the vertical direction.

Pluralities of locking holes 410 are formed in the top portion of the cap 400, in a circular arrangement, and the number of locking holes 410 can be changed variously as necessary. In the case where minute manipulation is needed, the locking holes can be provided more densely, or in a larger number. Alternatively, two (2) or four (4) of the locking holes can be provided at an angle of 90°.

The cap 400 is inserted into the stem 300 and is placed around the top portion of the body 200, and restraining means 420 is provided in the stem 300 or the handle 100 to allow the movement of the cap 400 in such a fashion that the cap 400 can always move in the vertical direction together with the handle 100 and the stem 300. In this embodiment, the restraining means 420 includes a support step 420a, as shown in FIG. 2, which is formed by different diameter portions of the stem 300. The support step 420a is configured to butt against the cap 400. Because of the support step 420a, the cap 400 can always move vertically together with the stem 300. Without the vertical movement of the stem 300, no external force can move down only the cap 400 to rotate the handle 100.

While the support step 420a is used as the restraining means 420 in this embodiment, it is possible to use a snap ring 420b to restrain the cap 400. That is, in place of the support step formed by the different diameter portions, it is possible to form a circular groove in the outer circumference of the stem and engage the snap ring into the groove, so that the snap ring can restrain the cap.

Figure 5:
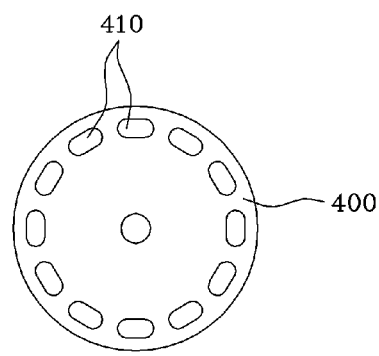
FIG. 5 is a plan view illustrating the cap, in which slot-type locking holes are formed.

As mentioned above, the locking holes 410 are formed in the top portion of the cap 400, and are shaped in the form of a circle, a polygon or a slot. FIG. 5 is a plan view of the cap, in which slot-shaped locking holes are formed. Compared with the configuration of a regular circle, the slot-shaped locking holes 410 have the advantage of easy manipulation since a rod pin 130b can be more easily fitted into the locking holes 410 when the handle is operated.

Figure 6:
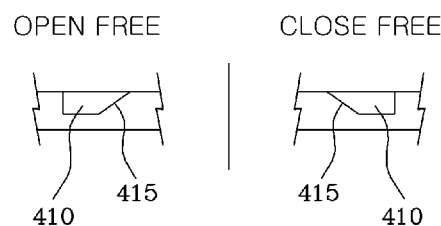
FIG. 6 is partial sectional views illustrating an alternative to the locking hole.

FIG. 6 is partial sectional views illustrating an alternative to the locking hole.

Occasionally, it is necessary to strictly restrict the valve operation in only one direction. That is, the valve can be operated freely in the opening or closing direction. In this case, as shown in FIG. 6, it is preferable that the locking hole 410 have a vertical portion and a slope 415 extending from the vertical portion, so that the bottom portion of the rod pin 130b, which engages into the locking hole 410, can move upward in contact with the slope 415. This means that it is not necessary to manipulate the rod pin 130b using a separate master key M in the case where the handle 100 is rotated toward the slope 415, but the master key M is required to rotate the handle 100 in the opposite direction.

The handle 100 has vertical hole 110 and a key hole 120, which cross each other. The locking means 130 is provided in the vertical hole 110 and the locking holes 410. The locking means 130 includes a rod pin 130b and an elastic member 130a. The rod pin 130b is supported at the top portion by an elastic member 130a such as a spring. The rod pin 130b is forced downward by the elastic member 130a, so that the bottom portion of the rod pin 130b remains inserted into the locking hole 410 of the cap 400. In the position where the bottom portion of the rod pin 130b is inserted into the locking hole 410, the handle 100 is not operated. To enable the operation of the handle, the rod pin 130b should be raised to be removed from the locking hole 410. This requires the master key M, which can be inserted through the key hole 120 to raise the rod pin 130b. In this embodiment, as the guide section 131 in the outer surface of the rod pin 130b adjacent to the top end thereof, a neck having a reduced diameter is formed, and a master key is formed to match this configuration, so that the rod pin gradually rises as the master key is inserted through the key hole.

Figure 7:
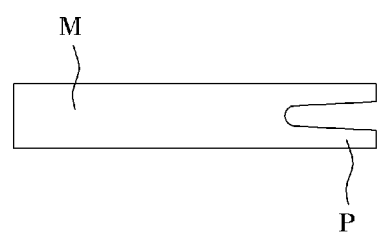
FIG. 7 is a schematic plan view illustrating the shape of an exemplary master key.

FIG. 7 is a schematic plan view illustrating the shape of an exemplary master key. One end of the master key is divided into two branches, each of which forms a slope. The branches are also called fork edges P. When the master key M is gradually inserted into the key hole 120 with the fork edges P contacting a guide section 131, the rod pin 130b is pushed upward by the slope. The guide section 131 and the master key, shaped to conform to the guide section 131, can be modified in various forms other than the proposed neck shape. According to the alternative, a through hole can be formed adjacent to the top portion of the rod pin, so that the rod pin can be gradually raised in response to the insertion of the end of the master key into the through hole.

In the needle valve of the first embodiment, the handle 100 is fixed to the top portion of the stem 300, which extends through the top portion of the cap 400, so that the rotational force of the handle 100 can be transmitted to the stem 300. To connect the handle 100 to the stem 300, various connecting means, such as a fixing bolt and adhesive, can be provided. However, in the case of the valve of the present invention, since the rod pin 130b in the handle 100 selectively engages with the locking hole 410 in the cap 400, if the rotation of the handle 100 does not correctly align the rod pin 130b with the locking hole 410, precise control should be performed until alignment is achieved. That is, this problem exists in the case where the stem and the handle are connected together in a completely fixed arrangement without play therebetween.

While the valve of the present invention includes a configuration in which the handle 100 and the stem 30 are fixedly connected to each other without play, it is more preferable that play exist in the handle when the handle and the stem are connected together. As shown in FIG. 2, a through hole 310 is formed in the top portion of the stem 300, a pin 102 is inserted into the through hole 310, and a bolt 101 is screwed through a side portion of the handle 100, so that the bolt 101 presses the pin 102. This configuration creates play between the handle and the stem, so that the rod pin can be smoothly inserted into the locking hole. As another configuration, the bolt and the pin are manufactured integrally, a terminal portion of the bolt, smoothly machined without threads, like a pin, is inserted into a through hole, and a threaded portion of the bolt is meshed with the handle. The smooth terminal portion of the bolt has a diameter smaller than that of the through hole, thereby giving play to the handle.

Furthermore, in the valve according to the first embodiment, a spring S can be provided between the cap 400 and the top end of the body 200. The spring S pushes the cap 400 upward so that the bottom surface of the handle 100 properly contacts the top surface of the cap 400. In the case where the snap ring, provided in the stem as the restraining means, is damaged, the spring can force the cap to move vertically.

Figure 8:
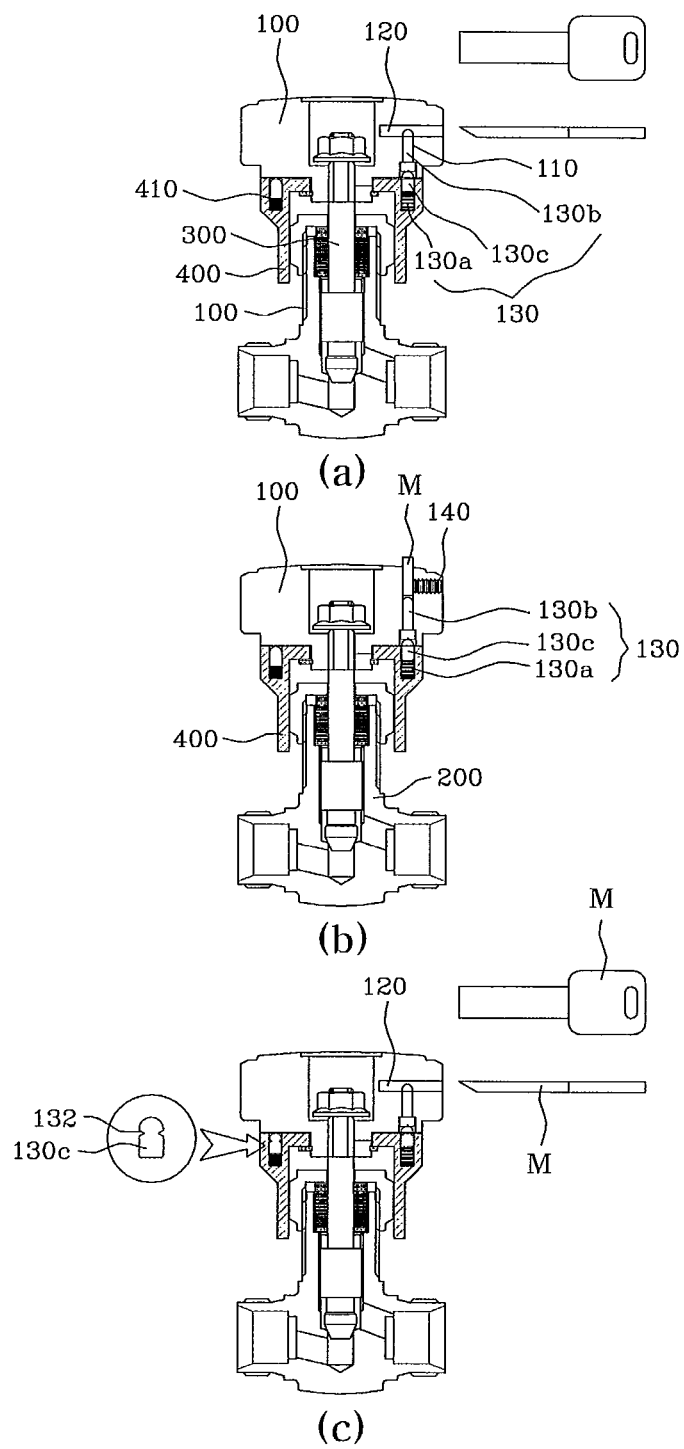
FIG. 8 is configuration views illustrating an alternative to the locking means.

FIG. 8 is configuration views illustrating an alternative to the locking means. It should be understood that the locking means 130 shown is only an example, and that the concept of the locking means of the present invention embraces all structures in which the handle and the cap are restrained, and in which the locked position of the handle can be released using the master key.

In place of the above mentioned construction, which includes the rod pin 130b having the guide section 131 and the elastic member 130a, the locking means 130 can include rod pins 130b, a stopper 130c and elastic members 130a. As shown in the drawing, the elastic member 130a is placed in the locking hole 410, and the stopper 130c is placed on top of the elastic member 130a. The stopper 130c is forced upward by the elastic member 130a, and the rod pin 130b is inserted into the vertical hole 110. When the vertical hole 110 is aligned with one of the locking holes 410, the top portion of the stopper 130c pushes up the bottom portion of the rod pin 130b. Then, the top portion of the stopper 130c protrudes from the top surface of the cap 400 and is inserted into the vertical hole 110. When the stopper 130c is placed in both the locking hole 410 and the vertical hole 110, the handle 110 is locked and cannot rotate. To operate the handle, the master key M is inserted through the key hole 120 to lower the rod pin 130b. After the stopper 130c is accordingly moved into the locking hole 410, the handle can be operated.

The key hole 120 is formed for the purpose of manipulation of the rod pin 130b. The key hole 120 can be formed perpendicularly to the vertical hole 110, or along a line coaxial with the vertical hole 110. The direction of the key hole can be suitably selected according to the place where the valve will be used. A female threaded portion 140 can be formed in the handle 120 in a direction perpendicular to the key hole 120. The female threaded portion 140 cooperates with a bolt to fix the master key M, which is inserted into the key hole 120 to release the locked position, to a predetermined position.

Furthermore, it is preferable that a wedge groove 132 be recessed in the stopper 130c along the outer circumference thereof. The wedge groove 132 forms a weak portion, which will fracture first when external force is applied to the handle. The wedge groove 132 of the stopper 130c is provided so that the handle can be forcibly operated in the event of an emergency. When impact is applied to the handle, the wedge groove of the stopper is fractured, so that the handle can be released from the locked position and come into a state in which the handle can be operated.

The shape of the key holes in the handle can be any one of a polygon, a circle and an irregular form. The irregular form includes any shapes including combinations of straight lines and curved lines, excluding regular shapes such as a quadrangle and a circle.

The shape of the master key can also be suitably selected according to the variation of the locking means, and thus be implemented in various forms in addition to those shown in the drawings.

Next, a valve according to a second embodiment of the present invention will be described. The valve of this embodiment is valve generally mounted to a Liquefied Petroleum Gas (LPG) tank (hereinafter also referred to as a "gas valve").

Figure 9:
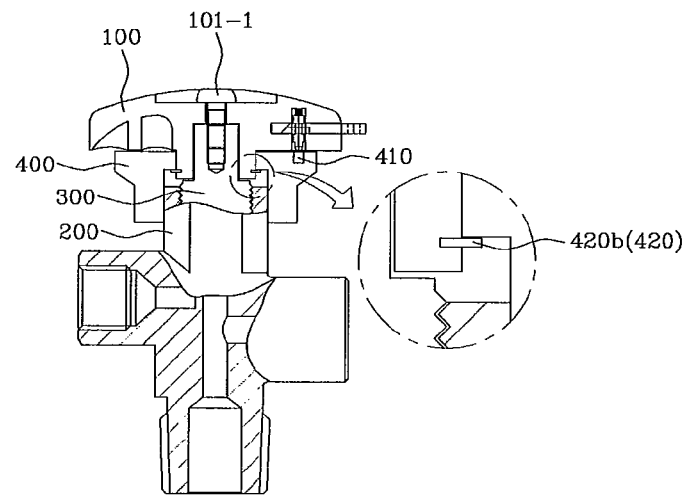
FIG. 9 is a schematic configuration view illustrating the structure of a gas valve according to a second embodiment of the present invention.
Figure 10:
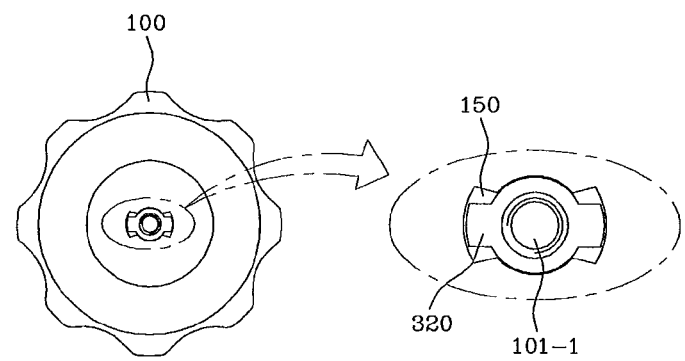
FIG. 10 is a plan view of the handle.

FIG. 9 is a schematic configuration view illustrating the structure of the gas valve according to the second embodiment of the present invention, and FIG. 10 is a plan view of the handle. The valve includes a body 200, a cap 400 and a handle 100, in which the cap 400 is disposed to surround the top portion of the body 200, and is vertically movable. Rotation-preventing means 210 is provided in the top portion of the body 200 to enable the vertical movement of the cap 400. The rotation-preventing means 210 can be implemented with a nut or a guide slot.

In particular, in this embodiment, restraining means 420 for allowing the cap 400 to vertically move together with the handle 100 and the stem 300 includes a snap ring 420b. The snap ring 420b is engaged with the outer circumference of the bottom portion of the handle 100, in a shape such that it contacts the cap 400. Of course, also in this embodiment, a snap ring 420b having a different shape can be provided in the stem 300.

As in the first embodiment, a vertical hole 110 and a key hole 120 are formed in the handle 100, and the locking means 130 is placed in the vertical hole 110. In addition, locking holes 410 formed in the top portion of the cap 400 can also be provided, as in the first embodiment.

The operation of the valve is not significantly different from that of the first embodiment, that is, it is substantially the same, and thus description of repeated parts will be omitted.

In the second embodiment, the connection structure between the handle 100 and the stem 300 is different from that of the first embodiment. As shown in the drawing, a bolt 101-1 extends from the top portion of the handle 100 to screw into the stem 300 in order to connect the handle 100 to the stem 300. Lugs 320 protrude out from the top portion of the stem 300 to allow a predetermined amount of play to the handle 100 relative to the stem 300. The handle 100 has lug recesses 150, which correspond to the lugs 320 but are wider than the lugs 320, so that the lugs 320 can move in the area of the lug recesses 150.

The handle 100 is restrained by the bolt 101-1 so that it does not escape from the stem 300. Since the handle 100 can rotate with respect to the stem 300, the handle 100 has a predetermined amount of play corresponding to the difference between the lugs and the lug recesses.

A structure in which a slope for allowing free rotation in one direction is given to the locking hole in the top portion of the cap, as mentioned in the first embodiment, is especially useful when applied to the gas valve of the second embodiment. An LPG tank, used at home or in restaurants, is generally located outside a building or on a roof. Therefore, anyone can access the LPG tank, and the valve can be operated easily. The valve is opened when the LPG tank is used, but it is safer to close the valve when the LPG tank is not used for a long time. In this case, if the valve is set to be operated only in one direction according to the present invention, accidents can be prevented.

Figure 11:
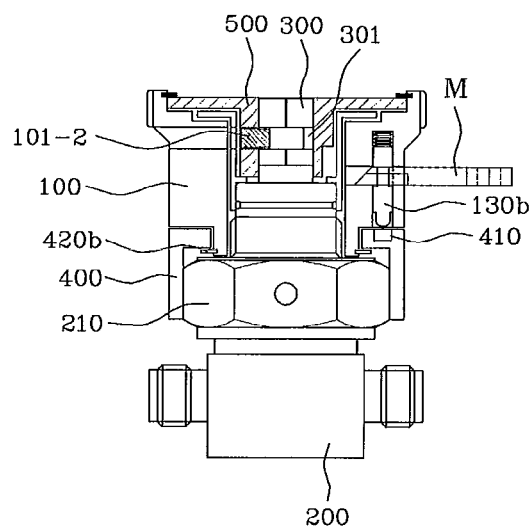
FIG. 11 is a schematic configuration view illustrating the structure of a diaphragm valve according to a third embodiment of the present invention.
Figure 12:
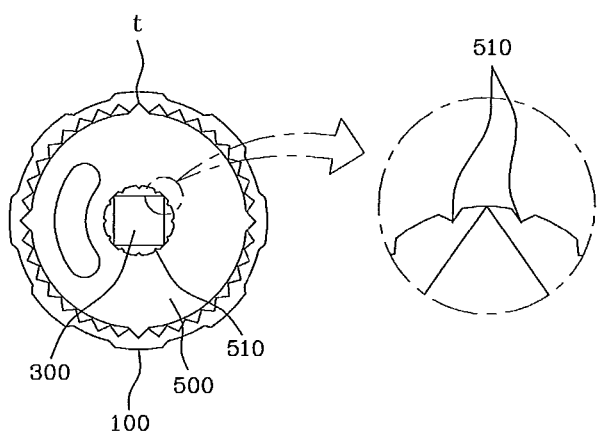
FIG. 12 is a plan view illustrating the stem engaged with the handle.

Next, a diaphragm valve according to a third embodiment of the present invention will be described. FIG. 11 is a schematic configuration view illustrating the structure of the diaphragm valve according to the third embodiment of the present invention, and FIG. 12 is a plan view illustrating the stem engaged with the handle.

The diaphragm valve of the present invention includes, as basic components, a body 200, a cap 400 and a handle 100. A rod pin 130b, which is vertically moved by a master key M, is placed in the handle 100, and the cap 400, placed on the top portion of the body 200, can move only vertically.

In this embodiment, rotation-preventing means 210 includes a polygonal nut, and restraining means 420 includes a snap ring 420b. The engaging structure of the handle and the stem is notably different from other embodiments, and this difference is the result of the intrinsic properties of the diaphragm valve.

In the third embodiment, the handle 100 is not directly connected to the stem 300, but is configured to indirectly transmit rotational force to the stem. As shown in the drawings, the handle 100 is placed above the cap 400, and a cover plate 500 is further provided between the handle 100 and the stem 300. The cover plate 500 is connected to the stem 300 by a bolt 101-2, and, more particularly, the distal end of the bolt 101-2 is inserted into a rotation hole 301 of the stem 300. Pluralities of indentations 510 are formed in a circular shape in the inner circumference of the cover plate 500, the stem 300 is inserted into the cover plate 500, and the stem 300 has a quadrangular cross section. Due to this configuration, the cover plate 500 has play in the range of one pitch of neighboring indentations 510. The connection between the cover plate 500 and the handle 100 is realized by male and female teeth t, which are formed in the upper inner periphery of the handle and the upper outer circumference of the cover plate. The male and female teeth t engage with each other so that rotational force can be transmitted.

The master key M is used to operate the handle 100, as in other embodiments. The rod pin 130b, inserted into the locking hole 410, which is formed in the top portion of the cap 400, is separated using the master key M, and then the handle is rotated to perform an opening or closing operation. The rotation of the handle 100 causes the cover plate 500 to rotate, and since the cover plate 500 is connected to the stem 300, the stem 300 finally rotates to move up or down. After the handle 100 is rotated to a desired angle, the rod pin 103b is moved down and is inserted into the locking hole 410. This is enabled by removing the master key M from the key hole 120, by which a rod pin 130b is moved down by the elastic member 130. In the connection of the cover plate 500 to the stem 300, the indentations 510 in the inner circumference of the cover plate 500 allow the cover plate 510 to play in the range of one pitch of neighboring indentations. This also causes the handle connected to the cover plate to play, and thus the rod pin can be smoothly inserted into the locking hole.

Those parts which have already been described in the first or second embodiments will not be described further.

The detailed construction and structural relationships of the valve of the invention have been described with respect to the proposed three embodiments.

According to the principle of operation of the valve of the present invention, the cap is provided in the top portion of the body to be vertically movable, and the rod pin provided in the handle is inserted into the locking hole, which is formed in the top portion of the cap. Accordingly, the operation of the handle is only possible using the master key.

That is, the rod pin maintains its position inserted into the locking hole. In order to enable the operation of the valve, the master key, which is machined to conform to the guide section of the rod pin, should be inserted into the key hole to raise the rod pin. Then, the handle can rotate freely, so that the stem and the handle can move up or down, thereby moving the cap up or down. After the operation of the handle, even if the handle is relocated, removing the master key causes the rod pin to descend again into the locking hole, thereby making the operation of the handle impossible.

The invention claimed is:

1. A valve, comprising:
    a handle placed above a body and connected directly or indirectly to a top portion of a stem protruding from the body, the handle moving vertically when rotated, thereby opening or closing a flow passage inside the body;
    a cap, into which the stem is inserted, and which surrounds a side of a top portion of the body and is allowed to move only vertically, the cap having a plurality of locking holes formed on a top portion thereof in a circular arrangement;
    the handle, having a vertical hole corresponding to the locking holes and a key hole extending coaxially with or perpendicularly to the vertical hole, the handle connected to the top portion of the stem to contact the top portion of the cap; and
    locking means provided in the vertical hole and the locking holes to lock the handle and the cap to each other, thereby limiting rotation of the handle,
    wherein the body has rotation-preventing means placed in the top portion which engages with the cap, wherein the rotation-preventing means prevents the cap from rotating,
    wherein a through hole is formed in the top portion of the stem, a pin is inserted into the through hole, and a bolt is screwed through a side portion of the handle to butt against the pin, so that a predetermined amount of play is allowed to the handle, and
    wherein a locked position is released using a master key, which is inserted through the key hole, thereby allowing the handle to be operated.

2. The valve according to claim 1, wherein the locking means includes:
    an elastic member placed inside the vertical hole; and
    a rod pin having a top portion supported by the elastic member and a bottom portion inserted into one of the locking holes, wherein the rod pin has a guide section in an outer portion adjacent to the top portion, the guide section partially overlapping the key hole, which crosses the vertical hole,
    wherein the master key is inserted through the key hole and contacts the guide section, so that the rod pin moves up to release the locked position.

3. The valve according to claim 2, wherein the guide section has a shape of a neck having a reduced diameter portion.

4. The valve according to claim 1, wherein the rotation-preventing means comprises a polygonal nut or a guide slot.

5. The valve according to claim 1, wherein the cap is moved up or down along with the handle by restraining means, which is located in the stem or in the handle, when the handle is moved up or down.

6. The valve according to claim 5, wherein the restraining means comprises a snap ring coupled to the stem or the handle or a support section formed by different diameter portions of the stem.

7. The valve according to claim 1, wherein the locking holes of the cap have a shape selected from a group consisting of a circle, a polygon and a slot.

8. The valve according to claim 7, wherein the locking holes have a slope allowing the handle to freely rotate in an opening or closing direction, whereby a lower portion of a rod pin rises in contact with and along the slope.

9. The valve according to claim 1, wherein the valve is a needle valve.

10. The valve according to claim 1, wherein a spring is further provided between the body and the cap.

11. The valve according to claim 1, wherein the key hole has a shape selected from a group consisting of a circle, a polygon and an irregular shape.

* * * * *